Feb. 8, 1927.
J. W. MacCLATCHIE
PIPE STOPPER
Filed Jan. 3, 1925
1,616,978
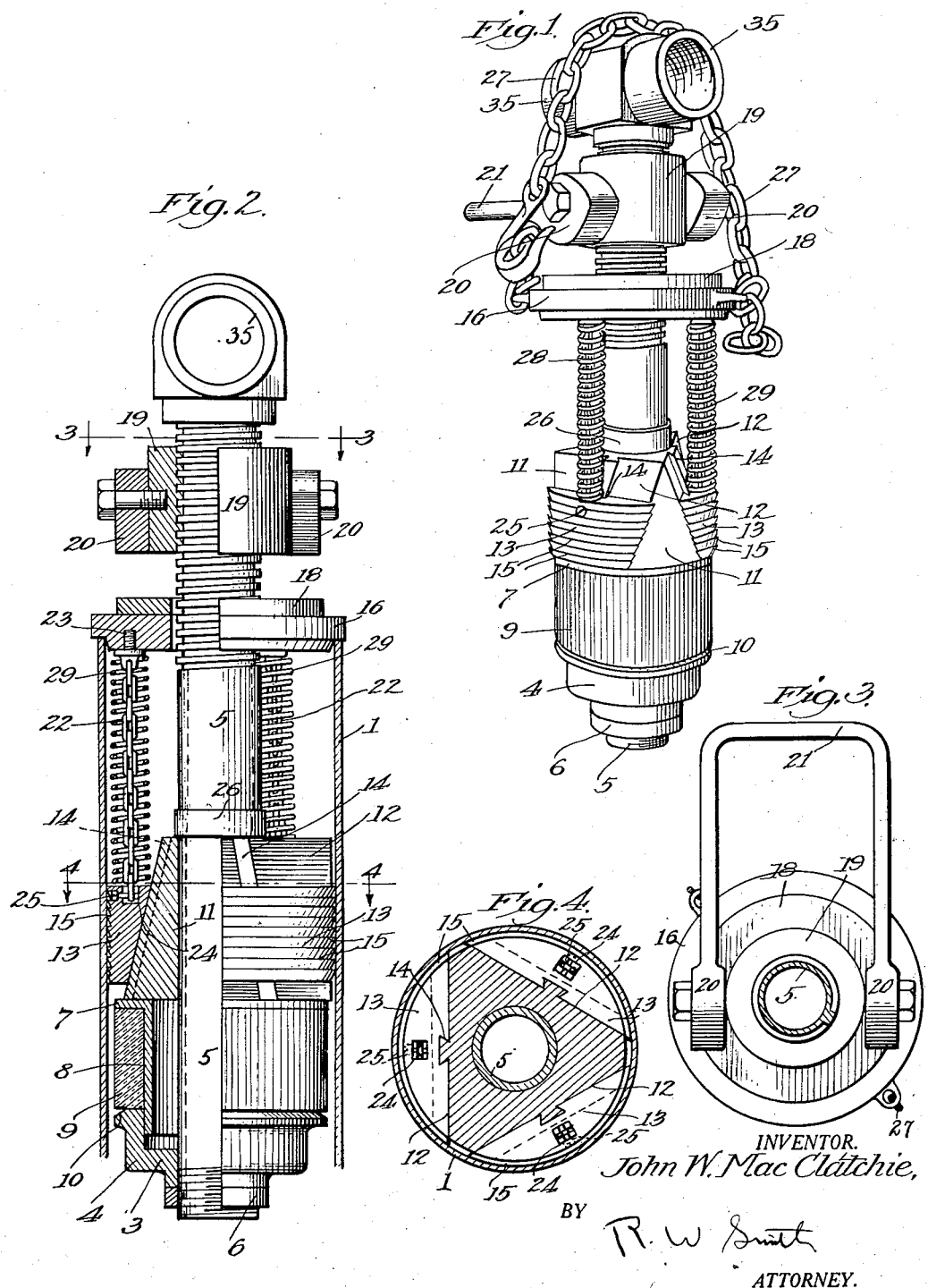
INVENTOR.
John W. Mac Clatchie,
BY R. W. Smith
ATTORNEY.

Patented Feb. 8, 1927.

1,616,978

UNITED STATES PATENT OFFICE.

JOHN W. MacCLATCHIE, OF COMPTON, CALIFORNIA.

PIPE STOPPER.

Application filed January 3, 1925. Serial No. 417.

This invention is a quick operating pipe stopper particularly adapted for use in cementing, circulating, and capping oil wells; and it is the object of the invention to provide locking and packing means between the stopper and a well casing, whereby pressure in said casing will tend to tighten said locking engagement and the packing connection.

It is a further object of the invention to provide a stopper having locking and packing means which will make positive engagement with a smooth interior surface of a casing, in order that the stopper may be connected directly to the wall of the casing without the necessity for specially constructed collars or other connecting means. The construction is thus particularly adapted for use in stove pipe casing and the like, in which the casing lengths are connected without the use of coupling collars, and are provided with smooth interior surfaces.

It is a still further object of the invention to provide a tight joint between the stopper and casing by means of expansible packing and to lock the stopper to the casing above said packing, by a single operation.

It is a still further object of the invention to provide a construction which will be positive and reliable in operation, and which is free from enclosed spaces such as are liable to clog with mud, cement, or the like.

The invention will be readily understood from the following description of the accompanying drawings, in which:

Fig. 1 is a perspective view of the stopper.

Fig. 2 is a vertical section through the end of a casing showing the stopper inserted therein.

Figs. 3 and 4 are transverse sections on the lines 3—3 and 4—4 of Fig. 2.

The stopper is adapted for insertion in the end of a casing 1 having a smooth interior surface and no coupling collar or the like on the end of said casing. The stopper comprises an end disc 3 having an upstanding peripheral flange 4, with a pipe 5 threaded to said disc at the center thereof, and projecting upwardly from said disc through the open end of the casing. A nut 6 adapted to be engaged by a pipe wrench is threaded on the end of pipe 5 against the disc 3 for locking the parts relative to one another.

A disc 7 is slidably mounted on pipe 5 in spaced relation above disc 3, and is provided with a depending sleeve 8 received inside of flange 4. A packing annulus 9 is mounted on the sleeve between flange 4 and the disc 7, so that movement of disc 3 toward disc 7 will longitudinally compress the packing annulus and thereby radially expand the same for tight engagement with the wall of the casing. The compression of the packing is limited by the abutment of sleeve 8 against disc 3, and the flange 4 is preferably beveled at its outer edge as shown at 10, so that the packing may readily expand for tight engagement with the casing wall as it is longitudinally compressed.

An expanding means is slidably mounted on pipe 5 above disc 7, and is shown as a mandrel 11 with its base resting upon disc 7, and its sides cut away to form upwardly converging tapering surfaces 12. Slips 13 are positioned above disc 7, with their inner inclined faces received against the inclined surfaces of the mandrel, the slips being connected to said mandrel for sliding adjustment relative thereto, by tongue and groove connections 14, and the outer arcuate surfaces of said slips having teeth 15 adapted to engage the smooth interior wall of a casing.

The slips are suspended from a cap 16 which is adapted to be received over the end of the casing, the suspension means being contractible and shown as chains 22. The upper ends of said chains are preferably linked to studs 23 which are threaded into the underside of cap 16, and the lower ends of said chains are fixed to slips 13 by inserting the last links of the chains in recesses 24 provided in the tops of the slips, and threading screws 25 through the sides of said slips into said recesses and through said links.

Means are provided for yieldably depressing the respective slips relative to mandrel 11, so that when the stopper is inserted in a casing the slips will equally engage the casing wall and center the stopper. For this purpose coil springs 29 are mounted on the chains 22, with the ends of said springs abutting against the tops of the slips and the underside of cap 16.

In order to fix the stopper in the end of a casing, the pipe 5 is drawn upwardly relative to the casing so as to elevate disc 3 and thereby expand packing 9 for making a tight joint between the stopper and the casing wall. Said movement of pipe 5 also elevates mandrel 11, which by longitudinal movement relative to slips 13, expands said slips and elevates the same slightly so that teeth 15 bite into the casing wall and thereby lock the stopper in the casing.

The means for elevating pipe 5 comprises a nut or collar 19 threaded on the end of the pipe which projects upwardly through an opening in cap 16. The pipe is freely slidable in said opening, and a fibre washer 18 is preferably mounted on the pipe and rests upon cap 16.

Cams 20 are pivoted to the sides of collar 19 and are connected by a handle 21 adapted to turn said cams or rotate the collar. To lock the stopper in casing 1, the collar 19 is screwed downwardly on pipe 5 to a point adjacent washer 18, and cams 20 are then turned so as to engage said washer, thereby elevating pipe 5 relative to casing 1 and thus operatively engaging slips 13 and packing 9 with the casing wall.

To release the stopper from locking engagement in the casing, cams 20 are turned until they disengage washer 18, and pipe 5 is thus free to drop in the well casing relative to cap 16. The lowering of pipe 5 depresses mandrel 11 by abutment of a collar 26 on said pipe, against the end of the mandrel; and said lowering of the mandrel relative to slips 13 releases the latter from locking engagement with the casing wall. The lowering of pipe 5 also depresses disc 3 relative to disc 7, so as to release packing 9 from longitudinal compression, thereby permitting radial contraction of said packing for disengagement from the casing wall. The cap 16 is then lifted by a chain 27 connected thereto, so as to remove the entire stopper from the well casing.

The pipe 5 provides means for passage of fluid through the stopper when it is inserted in a casing, and the upper end of said pipe is illustrated as connected to a usual T-coupling 35, adapted to engage a usual fluid conduit (not shown).

The mechanism as thus described forms no enclosed spaces in which foreign material may clog, and a tight joint is formed between the stopper and the casing wall below the locking means for the stopper. The packing and locking means are engaged with the casing wall by a single operation; and the pressure in the casing tends to expand the slips and expand the packing, so that increase in pressure in the casing will more firmly seat the stopper. The stopper may thus be operatively engaged with a smooth interior wall of a casing, since the teeth 15 will readily engage such a smooth surface, when the locking slips are forced upwardly during expansion thereof, by elevation of mandrel 11.

I claim:

1. A stopper adapted to be inserted in the end of a casing, comprising a cap for the casing, a support longitudinally movable through the cap, an abutment fixed on the lower end of the support, packing on said abutment, slips suspended from the cap, springs tending to yieldably depress the slips, means for expanding the slips to locking position by elevation of said expanding means relative to the slips, said expanding means being mounted on said packing, a member fixed on the support above the cap in adjusted position longitudinally of the support, and a cam attached to said member and adapted to elevate the support relative to the cap and lock the support in elevated position, thereby locking the slips in the casing, expanding the packing means against the casing, and clamping the cap on the casing.

2. A stopper adapted to be inserted in the end of a casing, comprising a cap for the casing, a support longitudinally movable through the cap, an abutment fixed on the lower end of the support, packing on said abutment, slips below the cap, means for tending to yieldably depress the slips, means for expanding the slips to locking position by elevation of said expanding means relative to the slips, said expanding means being mounted on said packing, and an operating means adapted to elevate the support relative to the cap and lock the support in elevated position, thereby locking the slips in the casing, expanding the packing means against the casing, and clamping the cap on the casing.

3. A stopper adapted to be inserted in the end of a casing, comprising a cap for the casing, a support longitudinally movable through the cap, an abutment fixed on the lower end of the support, packing on said abutment, slips above the packing, means for expanding the slips to locking position by elevation of said expanding means relative to the slips, said expanding means being mounted on the packing, a member fixed on the support above the cap in adjusted position longitudinally of the support, and a cam attached to said member and adapted to elevate the support relative to the cap and lock the support in elevated position, thereby locking the slips in the casing, expanding the packing means against casing, and clamping the cap on the casing.

4. A stopper adapted to be inserted in the end of a casing, comprising an abutment for the end of the casing, a support longitudinally movable in the casing relative to the abutment, packing on the lower end of the support, slips adapted to engage the casing, means tending to yieldably depress the slips, means for expanding the slips to locking position by elevation of the expanding means relative to the slips, said expanding means being mounted on the packing, and an operating means adapted to elevate the support relative to the abutment and lock the support in elevated position, thereby locking the slips in the casing, expanding the packing means against the casing, and clamping the abutment on the casing.

5. A stopper adapted to be inserted in the end of a casing, comprising an abutment for the end of the casing, a support longitudinally movable relative to the abutment in the casing, packing on the lower end of the support, slips above the packing, means for expanding the slips to locking position by elevation of the expanding means relative to the slips, the expanding means being mounted on the packing, a member fixed on the support above the abutment in adjusted position longitudinally of the support, and a cam attached to said member and adapted to elevate the support relative to the abutment and lock the support in elevated position, thereby locking the slips in the casing, expanding the packing means against the casing, and clamping the abutment on the casing, In testimony whereof I have affixed my signature to this specification.

JOHN W. MacCLATCHIE.